DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 6, 1970

870 O.G. 17

T870,003

ADHESIVE POLY(VINYL HALIDE) SHAPED ARTICLES, THEIR MANUFACTURE AND USE

Don R. Leonard and Albert D. Beeler, both of P.O. Box 511, Kingsport, Tenn. 37662

Filed Dec. 2, 1968, Ser. No. 780,594
Int. Cl. C09j *7/00*
U.S. Cl. 156—306
No Drawing. 13 Pages Specification

Gelled adhesive articles, such as tapes, are made from plasticized poly(vinyl halide) to which has been added curable polyesters, epoxy resins or phenol condensate resins. The article is made by blending together a vinyl halide polymer, a plasticizer therefor, and a curable adhesive polymer, and shaping and heating the blend in a controlled manner to gel the system. The blend may also be used for obtaining an adherent coating on an article by applying the blend onto the surface of an article and heating to develop the adhesion.